Patented Sept. 5, 1950

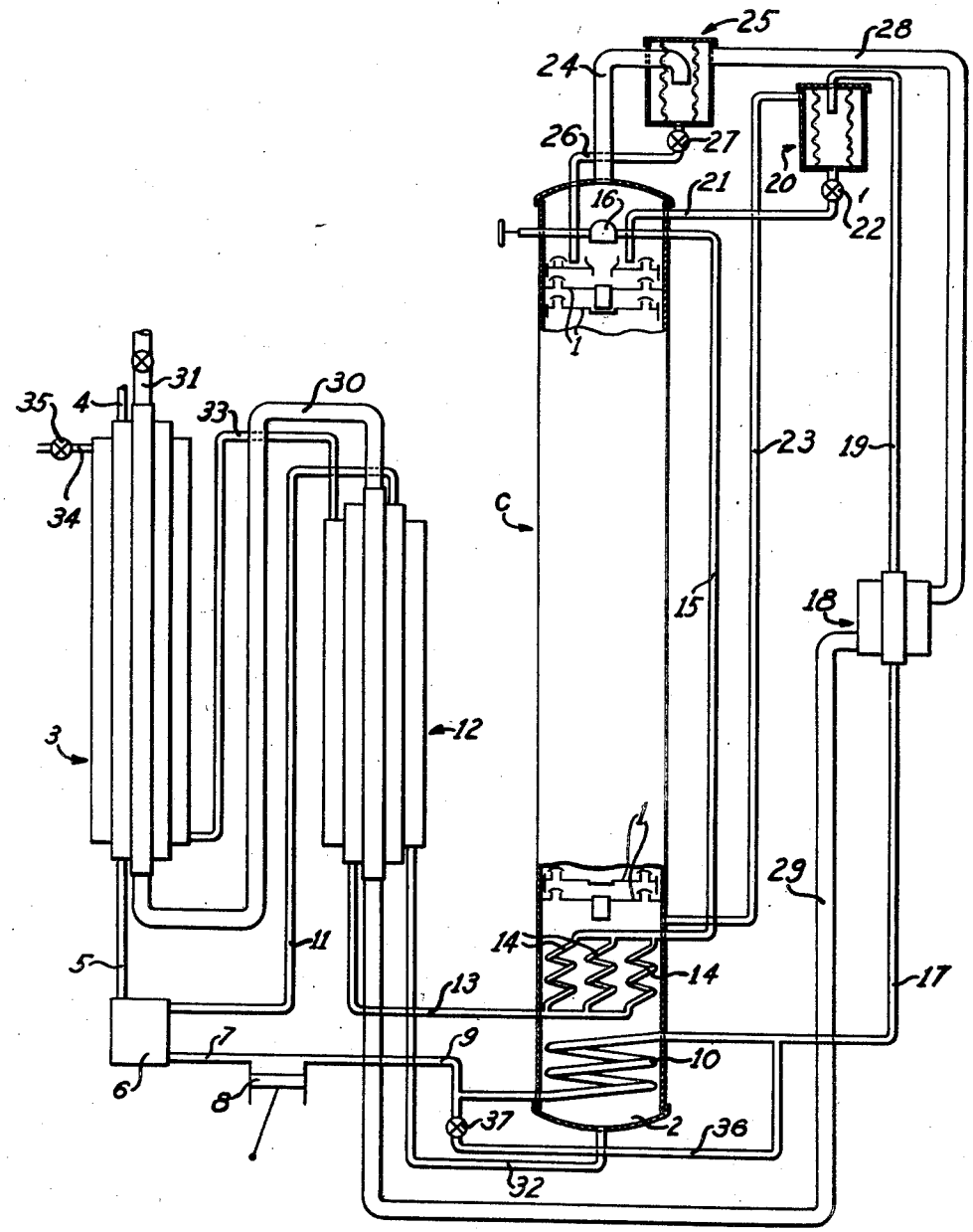

2,521,157

UNITED STATES PATENT OFFICE 2,521,157

METHOD OF SEPARATING THE CONSTITUENTS OF GASEOUS MIXTURES

Arthur J. Fausek and Irwing F. Fausek, Clayton, Mo.

Application March 19, 1947, Serial No. 735,718

5 Claims. (Cl. 62—175.5)

This invention relates to the separation of the constituents of gaseous mixtures, and more specifically to an improved method of separating the constituents of atmosphere by liquefaction and rectification, the predominant object of the invention being to provide an improved method in the use of which separated liquid and vaporous mediums are introduced into a rectifying column at points thereof where said liquid and vaporous mediums may follow their natural tendencies to respectively descend and rise within the column so as to obtain the maximum efficiency of the column in a simple and expeditious manner.

The present invention is predicated on the fact that when some gaseous mixtures are compressed and cooled sufficiently and then expanded, there is produced a drop in temperature and a consequent liquefaction of at least a portion of said gaseous mixtures. It has been found in the case of atmosphere that at the temperatures and pressures ordinarily required for separation, only a portion of the atmosphere is converted into liquid, the remainder of the atmosphere being in the form of a vapor, or saturated vapor. This improvement has to do with the separation and use of these two mediums to the best possible advantage in the rectifying section of a column, the invention contemplating separating the liquid and vapor of the atmosphere being treated in a simple separator external to the column, and the introduction of the vapor directly from the separator into the column at a point below the rectifying trays of the column and the introduction of the liquid directly from the separator into the upper portion of the column, or at an intermediate point in the case of a double rectification column. Thus, the vapor is permitted to follow its natural tendency to rise within the column while the liquid is likewise permitted to follow its natural tendency to descend within the column whereby the efficiency of the column is increased in an extremely simple and expeditious manner.

It is a fact well known to persons familiar with such matters, that some oxygen passes out of the rectifying section of the column along with the outgoing nitrogen, and heretofore such oxygen has been lost, except for its refrigeration value, and thus effected the recovery efficiency of the column. In accordance with the present invention, however, a separator is employed to remove all of the liquid carried by the outgoing nitrogen, and such liquid is returned to a suitable point in the column whereby the efficiency of the column is improved.

In order that the invention may be clearly understood and readily carried into effect, the same will now be described more fully with reference to the accompanying drawing, the single view of which illustrates in a diagrammatic manner an apparatus suitable for the purpose.

In the drawing, C designates generally a liquefaction and rectification column, said column comprising a vertically disposed housing within which is arranged a plurality of conventional rectification trays 1 disposed in the usual vertical spaced relation, the extreme lower portion of the housing of the column C providing the boiling pot of the column 2. The apparatus illustrated in the drawing includes a heat interchanger 3 to which high-pressure atmosphere is delivered by a conductor 4, said high-pressure atmosphere passing from said heat interchanger by way of a conductor 5 to a receiver 6 wherein said atmosphere is divided, one portion passing by way of a conductor 7 to an expansion engine 8, and from said expansion engine by way of a conductor 9 to a coil 10 which is located within the boiling pot 2 of the column C, and another portion of the divided atmosphere passing from the receiver 6 by way of a conductor 11 to and through a liquefier 12, and thence by way of a conductor 13 to a plurality of coils 14 which are located within the lower portion of the column C above the previously mentioned coil 10. From the coils 14 medium is conducted by a conductor 15 to an expansion valve 16 which is located immediately above the topmost of the rectification trays 1.

From the coil 10 within the boiling pot 2 of the column C medium is conducted by a conductor 17 to a heat interchanger 18, and from said heat interchanger such medium is conducted by a conductor 19 to a separator 20 which is of suitable construction and arrangement to separate the liquid and vaporous portions of the medium delivered to said separator. Liquid is conducted from the separator by a conductor 21 and this liquid is delivered to the upper portion of the column C preferably, though not necessarily, above the topmost of the rectification trays 1, said conductor 21 having interposed therein a valve 22 through the instrumentality of which passage of liquid through said conductor 21 may be controlled. Likewise, vapor is conducted by a conductor 23 from the separator to the lower portion of the column C for discharge from said conductor 23 into the column at a point immediately beneath the lowermost of the rectification trays 1.

Vaporous nitrogen passes from the upper portion of the column C through the conductor 24 and this nitrogen is delivered by said conductor 24 to a separator 25 wherein any liquid oxygen carried by the vaporous nitrogen is separated therefrom, and this liquid oxygen is conducted by a conductor 26 to the upper portion of the column C, wherein it is discharged from said conductor 26 at a point immediately above the topmost of the rectification trays 1, passage of liquid oxygen through the conductor 26 being controlled by a valve 27. Vaporous nitrogen is conducted from the separator 25 by a conductor 28 to the heat interchanger 18, said vaporous nitrogen being conducted from said heat interchanger 18 to the liquefier 12 by a conductor 29, and being conducted from said liquefier 12 by a conductor 30 to the heat interchanger 3 from which it is conducted by a valved conductor 31, said vaporous nitrogen being extremely cold and serving as a refrigerating medium in the heat interchanger 18, the liquefier 12, and the heat interchanger 3.

Substantially pure, liquid oxygen is conducted from the boiling pot 2 by way of a conductor 32 to the liquefier 12, and said liquid oxygen is conducted from said liquefier 12 by a conductor 33 to the heat interchanger 3, said liquid oxygen being conducted away from said heat interchanger 3 by a conductor 34. The conductor 34 has interposed therein a valve 35 which serves to control passage of liquid oxygen through said conductor 34.

From the foregoing it is obvious that an extremely simple method of separating the constituents of atmosphere, and other gaseous mixtures, is provided, in accordance with which vaporous medium is delivered directly to the lower portion of the column C for natural passage upwardly through the rectifying section of the column. Also, liquid medium is delivered directly to the upper portion of the column for natural passage downwardly through the rectifying section of the column. Additionally, any liquid oxygen carried by the vaporous nitrogen passing from the column is separated from said vaporous nitrogen and is returned to the upper portion of the column for natural downward passage through the rectifying section of the column.

If desired the apparatus for carrying out the improved method disclosed herein may include a conductor 36 which is provided with a valve 37. This conductor 36 is connected at its opposite ends into the conductors 9 and 17, respectively, and it serves to by-pass medium passing from the expansion engine 8 around the coil 10 within the boiling pot 2 of the column C.

We claim:

1. The method of separating a compressed gaseous mixture into its constituents by liquefaction and rectification which comprises preliminarily cooling the compressed mixture to effect partial liquefaction thereof, delivering a part of the gaseous mixture being treated to a column for expansion therein, separating the liquid phase fraction of the remainder of the mixture from the vaporous phase fraction thereof, delivering the liquid so obtained directly to the upper portion of a rectification section of a column for passage downwardly through said rectification section of said column, and directing the vapors so obtained directly to said column for passage upwardly through a rectification section of said column.

2. The method of separating a compressed gaseous mixture into its constituents by liquefaction and rectification which comprises preliminarily cooling the compressed mixture to effect partial liquefaction thereof, delivering a part of the gaseous mixture being treated to a column for expansion therein, separating the liquid phase fraction of the remainder of the mixture from the vaporous phase fraction thereof, delivering the liquid so obtained directly to the upper portion of a column at a point above a rectification section of said column for passage downwardly through said rectification section of said column, and directing the vapors so obtained directly to the lower portion of said column at a point beneath a rectification section of said column for passage upwardly through said rectification section of said column.

3. The method of separating a compressed gaseous mixture into its constituents by liquefaction and rectification which comprises preliminarily cooling the compressed mixture to effect partial liquefaction thereof, delivering a part of the gaseous mixture being treated to a column for expansion therein, separating the liquid phase fraction of the remainder of the mixture from the vaporous phase fraction thereof, delivering the liquid so obtained directly to a column at a point above a rectification section of said column for passage downwardly through said rectification section of said column, directing the vapors so obtained directly to said column at a point beneath a rectification section of said column for passage upwardly through said rectification section of said column, and separating from vapors passing from the top of said column liquid carried thereby.

4. The method of separating a compressed gaseous mixture into its constituents by liquefaction and rectification which comprises preliminarily cooling the compressed mixture to effect partial liquefaction thereof, delivering a part of the gaseous mixture being treated to a column for expansion therein, separating the liquid phase fraction of the remainder of the mixture from the vaporous phase fraction thereof, delivering the liquid so obtained directly to a column at a point above a rectification section of said column for passage downwardly through said rectification section of said column, directing the vapors so obtained directly to said column at a point beneath a rectification section of said column for passage upwardly through said rectification section of said column, and separating from vapors passing from the top of said column liquid carried thereby and returning said liquid to said column.

5. The method of separating a compressed gaseous mixture into its constituents by liquefaction and rectification which comprises preliminarily cooling the compressed mixture to effect partial liquefaction thereof, delivering a part of the gaseous mixture being treated to a column for expansion therein, separating the liquid phase fraction of the remainder of the mixture from the vaporous phase fraction thereof, delivering the liquid so obtained directly to a column at a point above a rectification section of said column for passage downwardly through said rectification section of said column, directing the vapors so obtained directly to said column at a point beneath a rectification section of said column for passage upwardly through said rectification section of said column, and separating from vapors passing from the top of said column liquid carried thereby and returning said liquid to said column at a point above the rectification section of said column.

ARTHUR J. FAUSEK.
IRWING F. FAUSEK.

REFERENCES CITED

The following references are of record in the file of this patent:

UNITED STATES PATENTS

| Number | Name | Date |
| --- | --- | --- |
| 1,773,012 | Schuftan | Aug. 12, 1930 |